United States Patent
Lee et al.

(10) Patent No.: US 6,822,716 B2
(45) Date of Patent: Nov. 23, 2004

(54) IN-PLANE SWITCHING LIQUID CRYSTAL DISPLAY WITH AN ALIGNMENT FREE STRUCTURE AND METHOD OF USING BACK EXPOSURE TO FORM THE SAME

(75) Inventors: Deuk Su Lee, Taoyuan Hsien (TW); Tean-Sen Jen, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 39 days.

(21) Appl. No.: 10/315,774

(22) Filed: Dec. 10, 2002

(65) Prior Publication Data

US 2004/0109120 A1 Jun. 10, 2004

(51) Int. Cl.[7] .............................................. G02F 1/1343
(52) U.S. Cl. ...................................................... 349/141
(58) Field of Search ................................ 349/139, 141, 349/144

(56) References Cited

U.S. PATENT DOCUMENTS 6,549,260 B1 * 4/2003 Shibahara .................... 349/155
6,760,082 B2 * 7/2004 Lee .............................. 349/42

* cited by examiner

Primary Examiner—Robert H. Kim
Assistant Examiner—Richard H Kim
(74) Attorney, Agent, or Firm—Thomas, Kayden, Horstemeyer & Risley

(57) ABSTRACT

An in-plane switching liquid crystal display with an alignment free structure. In each pixel area, at least one floating metal layer is disposed between two common electrodes and patterned on the same plane with the common electrodes, and at least one pixel electrode is disposed between the two common electrodes and covers the floating metal layer. The center of the pixel electrode is aligned to the center of the floating metal layer, and each interval between two adjacent common electrode and pixel electrode is fixed at a constant.

22 Claims, 19 Drawing Sheets

IN-PLANE SWITCHING LIQUID CRYSTAL DISPLAY WITH AN ALIGNMENT FREE STRUCTURE AND METHOD OF USING BACK EXPOSURE TO FORM THE SAME

BACKGROUND OF THE INVENTION

1. Field of the Invention

The present invention relates in general to an in-plane switching liquid crystal display (IPS-LCD). In particular, the present invention relates to an IPS-LCD with an alignment free structure and a method of using back exposure to form the same.

2. Description of the Related Art

Liquid crystal displays (LCDs) may be classified by the orientation of the LC molecules between the spaced apart glass substrates. In a conventional twisted nematic LCD (TN-LCD), the LC molecules are twisted between the two substrates. In contrast, in an in-plane switching LCD (IPS-LCD), common electrodes and pixel electrodes are formed on a lower glass substrate (TFT substrate) and an in-plane electric field therebetween is generated to rearrange the LC molecules along the electric field. Accordingly, the IPS-LCD has been used or suggested for improving drawbacks of the conventional TN-LCD, such as a very narrow viewing angle and a low contrast ratio.

In order to achieve a better result of the in-plane electric field, a comb-shaped electrode array is built in the IPS-LCD to solve the problems such as an insufficient aperture ratio and crosstalk produced between data lines and common electrodes. FIGS. 1A and 1B are sectional diagrams of a conventional IPS-LCD. FIG. 1A shows the alignment of the LC molecules at an off state, and FIG. 1B shows the alignment of the LC molecules at an on state. The IPS-LCD has a lower glass substrate 10, an upper glass substrate 12, and a liquid crystal layer 14 disposed in a space between the two parallel glass substrates 10 and 12. On the lower glass substrate 10, serving as a TFT substrate, a plurality of strip-shaped common electrodes 16 arranged as a comb-shape structure is patterned on the lower glass substrate 10, an insulating layer 18 is deposited on the common electrodes 16 and the lower glass substrate 10, and a plurality of strip-shaped pixel electrodes 20 arranged as a comb-shape structure is patterned on the insulating layer 18.

As shown in FIG. 1A, before an external voltage is applied to the IPS-LCD, the LC molecules 14A are aligned in a direction parallel to the lower glass substrate 10. As shown in FIG. 1B, when an external voltage is applied to the IPS-LCD, an in-plain electric field 22 is generated between the common electrode 16 and the pixel electrode 20, resulting in a rotation of the LC molecules 14B toward the in-plane electric field 22.

Depending on the material and the structure design of the common electrode 16 and the pixel electrode 20, the conventional comb-shaped electrode array is classified as three types. FIGS. 2A to 2C are sectional diagrams showing three types of the common electrode 16 and the pixel electrode 20 in the conventional comb-shaped electrode array. In the first type, as shown in FIG. 2A, the common electrode 16 and the pixel electrode 20 are patterned on the same plane and made of a transparent conductive material, such as ITO or IZO. In the second type, as shown in FIG. 2B, the common electrode 16 made of a non-transparent conductive material, such as Al and MoW, is patterned on the lower glass substrate 10 followed by depositing the insulating layer 18, and then the pixel electrode 20 made of a transparent conductive material, such as ITO or IZO, is patterned on the insulating layer 18. In the third type, as shown in FIG. 2C, the common electrode 16 and the pixel electrode 20 are patterned on the same plane and made of a non-transparent conductive material, such as Al and MoW.

FIG. 3 is a simulation result of the optical characteristics of opaque electrodes (Al) and transparent electrodes (ITO). The transmittance is estimated 1.25 times when one of the pair electrodes is transparent, and 1.5 times when both of the pair electrodes are transparent respectively. The first type (FIG. 2A) can provide a greater luminance to the IPS-LCD than the second type (FIG. 2B) and the third type (FIG. 2C). The first type (FIG. 2A), however, provides a worsen view-angle characteristic than the second type and the third type. Also, the third type severely decreases the luminance of the IPS-LCD because most of the light is blocked by the non-transparent conductive material. Therefore, the second type (FIG. 2B) is the most common type used in the conventional comb-shaped electrode array.

FIGS. 4A to 4C show the response characteristics of each electrode type corresponding to the first type (FIG. 2A), the second type (FIG. 2B) and the third type (FIG. 2C), respectively. The frame frequency dependence on the flicker property are observed in the second type, but not observed in other types. This means that LC molecules move on transparent electrodes and the behavior influences that optical characteristics. Also, as shown in FIG. 4B, the luminance variation is found in the second type. This phenomenon is caused by flexo-electro polarity when a voltage is applied to the electrodes, resulting in the offset flicker.

FIG. 5A is a top view showing an electrode array within a pixel area of an IPS-LCD according to the prior art, and FIG. 5B is a sectional view along line I—I of FIG. 5A showing the electrode array of the IPS-LCD according to the prior art. The conventional IPS-LCD 1 has a plurality of pixel areas arranging in a matrix form and constituted by a plurality of gate lines 2 and data lines 4. Each pixel area comprises a TFT structure 6, a comb-shaped common electrode structure 16 and a comb-shaped pixel electrode structure 20. The comb-shaped common electrode structure 16 comprises a bar 16a and three teeth 16b, and the comb-shaped pixel electrode structure 20 comprises a bar 20a and two teeth 20b. By using the second type as shown in FIG. 2B, the teeth 16b and the teeth 20a of different transmittance materials are patterned on different planes.

However, since misalignment in the photolithography process is not easily controlled, it is possible to form different intervals between the common electrodes 16 and the pixel electrodes 20 on the electrode array, resulting in different capacitances and transmittances. FIG. 6 is a simulation result of the misalignment effect. In this practical case, demerits such as trip mura, shot mura and flicker are commonly found in the conventional IPS-LCD.

SUMMARY OF THE INVENTION

An object of the present invention is to provide an IPS-LCD with an alignment free structure and a method of using back exposure to form the same. This alignment free structure can solve the demerits of shot mura and flicker found in the prior art.

In each pixel area of the IPS-LCD with an alignment free structure, at least one floating metal layer is disposed between two common electrodes and patterned on the same plane with the common electrodes, and at least one pixel electrode is disposed between the two common electrodes and covers the floating metal layer. The center of the pixel electrode is aligned to the center of the floating metal layer, and each interval between two adjacent common electrode and pixel electrode is fixed at a constant.

A method of forming an in-plane switching liquid crystal display with an alignment free structure, comprises steps of: providing a glass substrate; forming a plurality of gate lines extending in a first direction on the glass substrate; forming a comb-shaped common electrode structure within each predetermined pixel area, wherein the comb-shaped common electrode structure comprises a common bus line parallel to the gate line and at least two common electrodes extending in a second direction that is perpendicular to the first direction; forming a floating metal pattern within each predetermined pixel area, wherein the floating metal pattern comprises at least one floating metal layer extending in the second direction between the two common electrodes; forming an insulating layer to cover the gate lines, the comb-shaped common electrode structure, the floating metal pattern and glass substrate; forming a plurality of data lines extending in the second direction on the insulating layer, wherein the data lines and the gate lines constitute a plurality of pixel areas arranging in a matrix form; forming an passivation layer on the entire surface of the glass substrate; forming a comb-shaped pixel electrode structure disposed in each pixel area on the passivation layer, wherein the comb-shaped pixel electrode structure comprises a bar near the gate line and at least one pixel electrode that extends in the second direction between the two common electrodes and covers the floating metal layer. The center of the pixel electrode is aligned to the center of the floating metal layer, and each interval between two adjacent common electrode and pixel electrode is fixed at a constant.

It is an advantage of the present invention that using back exposure from the back side of the bottom glass substrate to fine tunes the pattern of pixel electrodes. Thus, the center of the pixel electrode can be aligned to the center of the floating metal layer so as to provide the same degree of in-plane electric field in each sub-pixel area. This results in the same capacitance and transmittance in each sub-pixel area to eliminate trip mura, shot mura and flicker found in the conventional IPS-LCD.

This and other objective of the present invention will no doubt become obvious to those of ordinary skill in the art after having read the following detailed description of the preferred embodiments which are illustrated in the various figures and drawings.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

[First Embodiment]

Figure 1B:
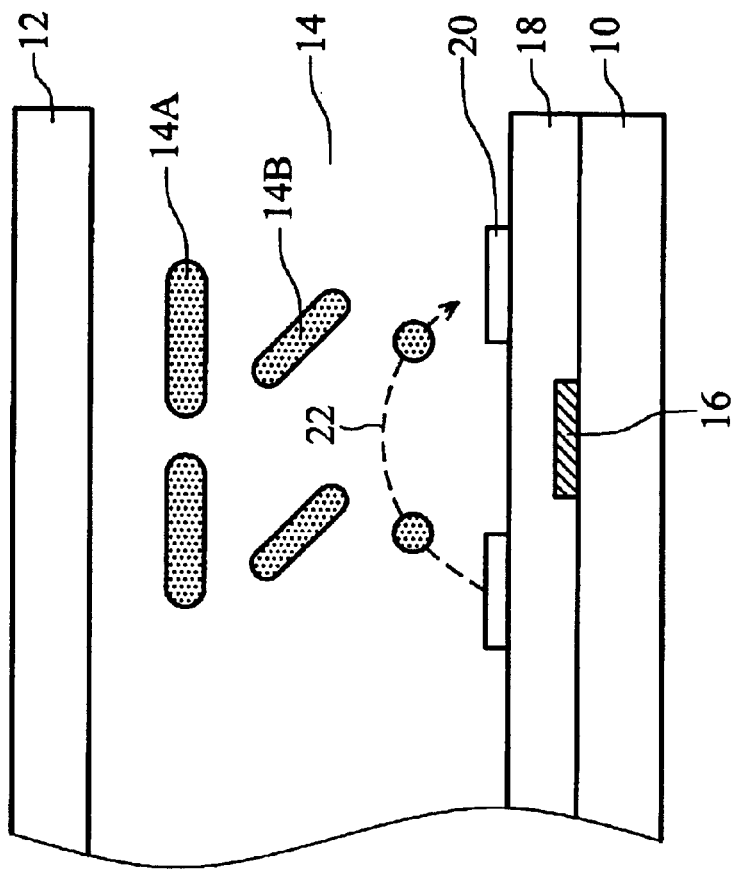
FIG. 1B is a sectional diagram showing the alignment of the LC molecules at an on state according to the conventional IPS-LCD.
Figure 1A:
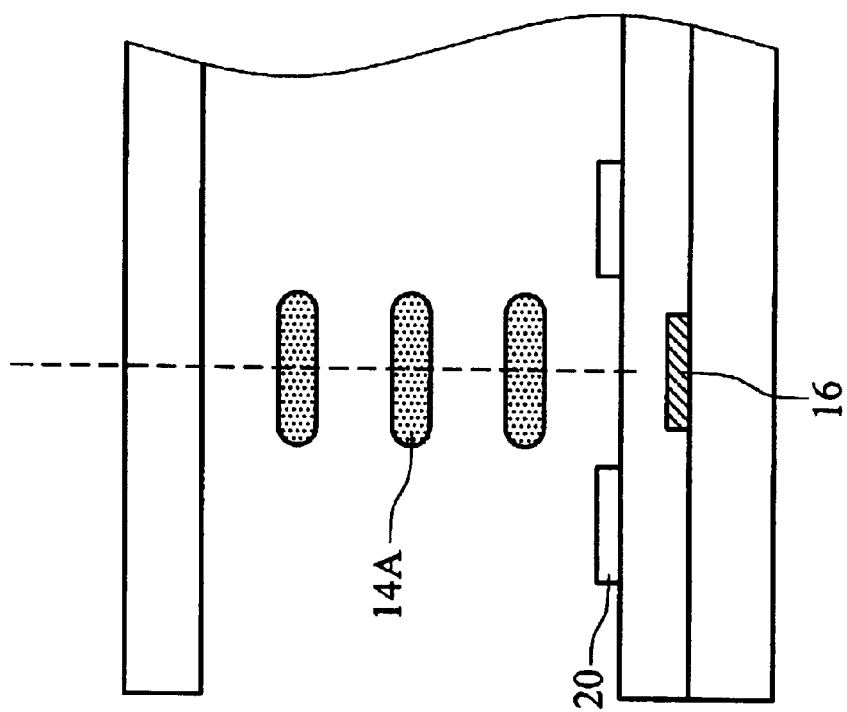
FIG. 1A is a sectional diagram showing the alignment of the LC molecules at an off state according to the conventional IPS-LCD.
Figure 2A:
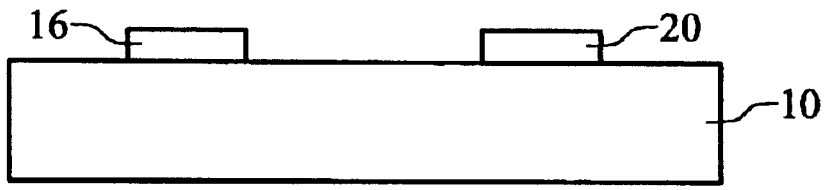
FIG. 2A is a sectional diagram showing the first type of the common electrode and the pixel electrode in the conventional comb-shaped electrode array.
Figure 2B:
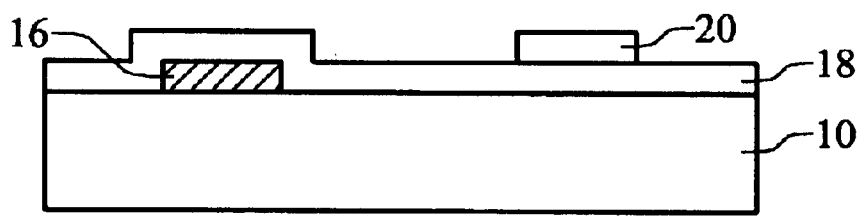
FIG. 2B is a sectional diagram showing the second type of the common electrode and the pixel electrode in the conventional comb-shaped electrode array.
Figure 2C:
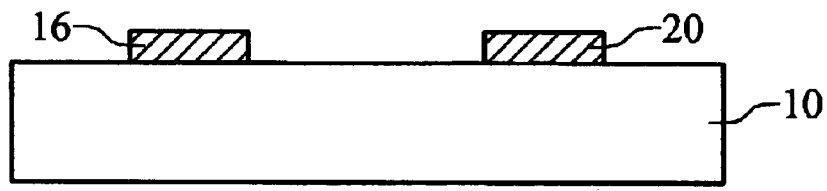
FIG. 2C is a sectional diagram showing the third type of the common electrode and the pixel electrode in the conventional comb-shaped electrode array.
Figure 3:
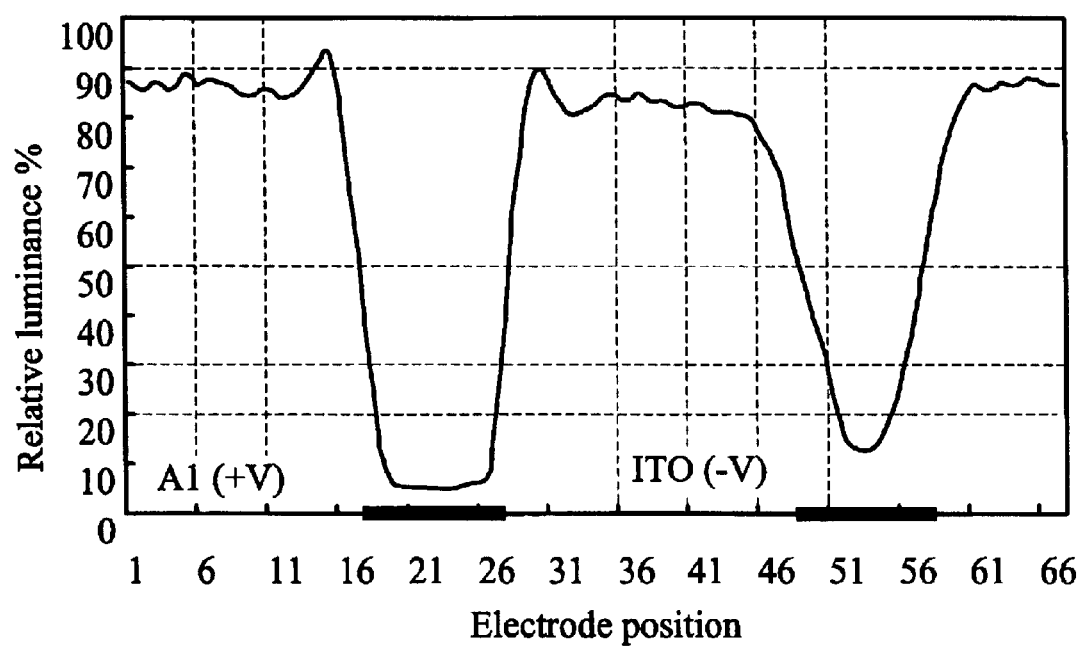
FIG. 3 is a simulation result of the optical characteristics of opaque electrodes (Al) and transparent electrodes (ITO).
Figure 4A:
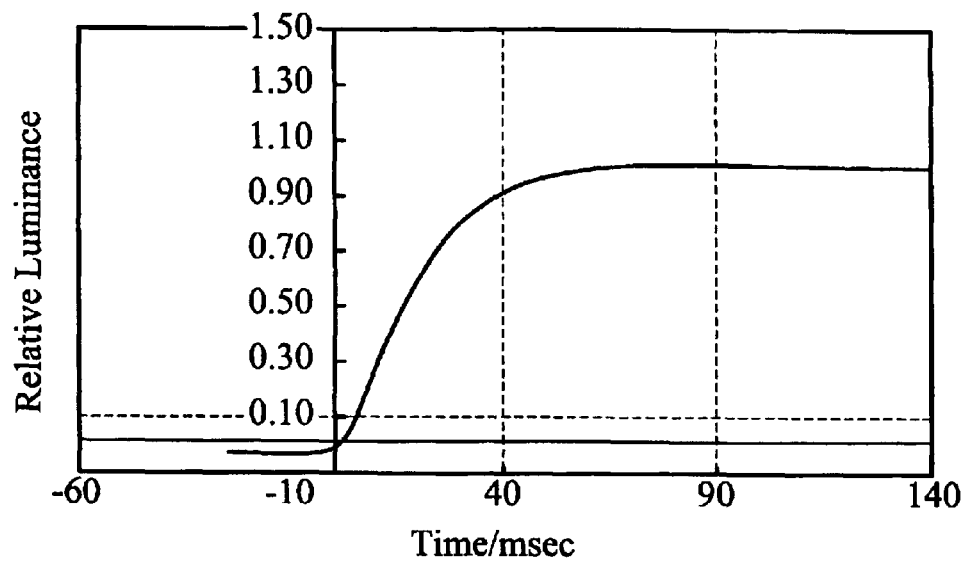
FIGS. 4A to 4C are the response characteristics of each electrode type corresponding to the first type (FIG. 2A), the second type (FIG. 2B) and the third type (FIG. 2C), respectively.
Figure 4B:
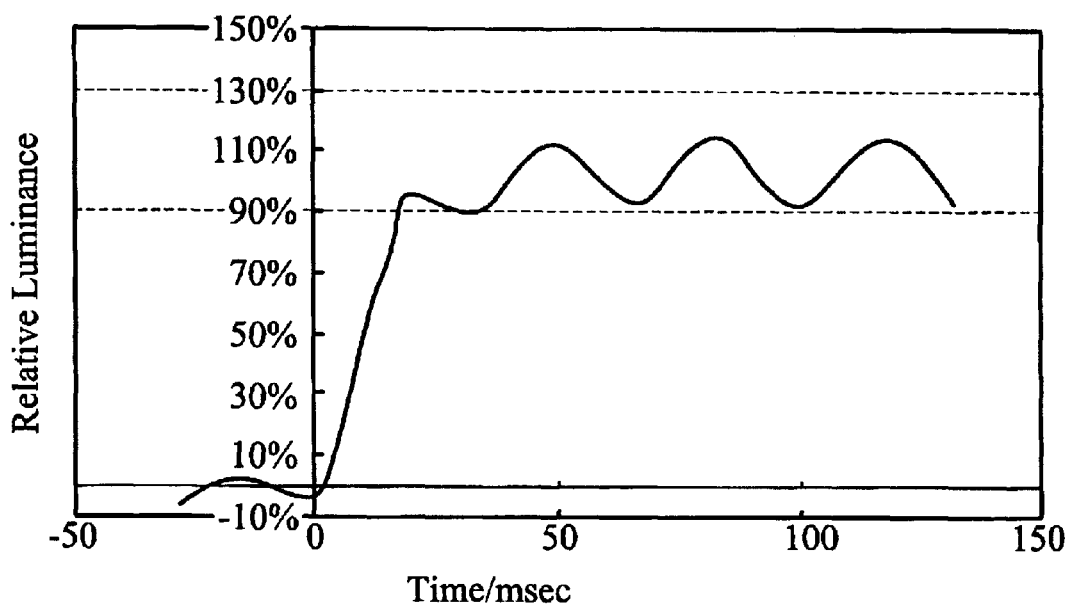
Figure 4C:
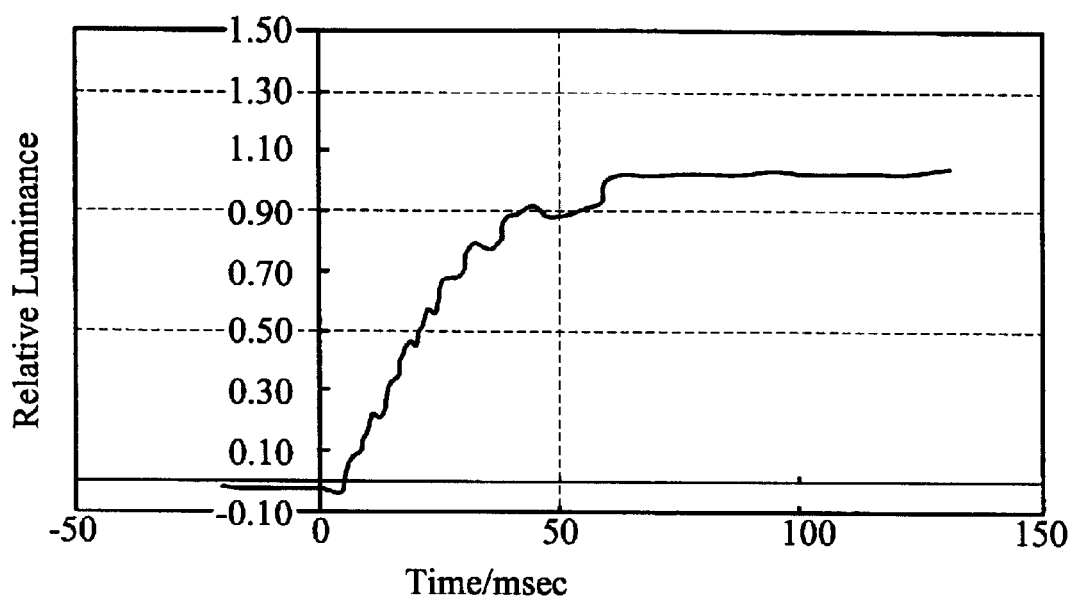
Figure 5A:
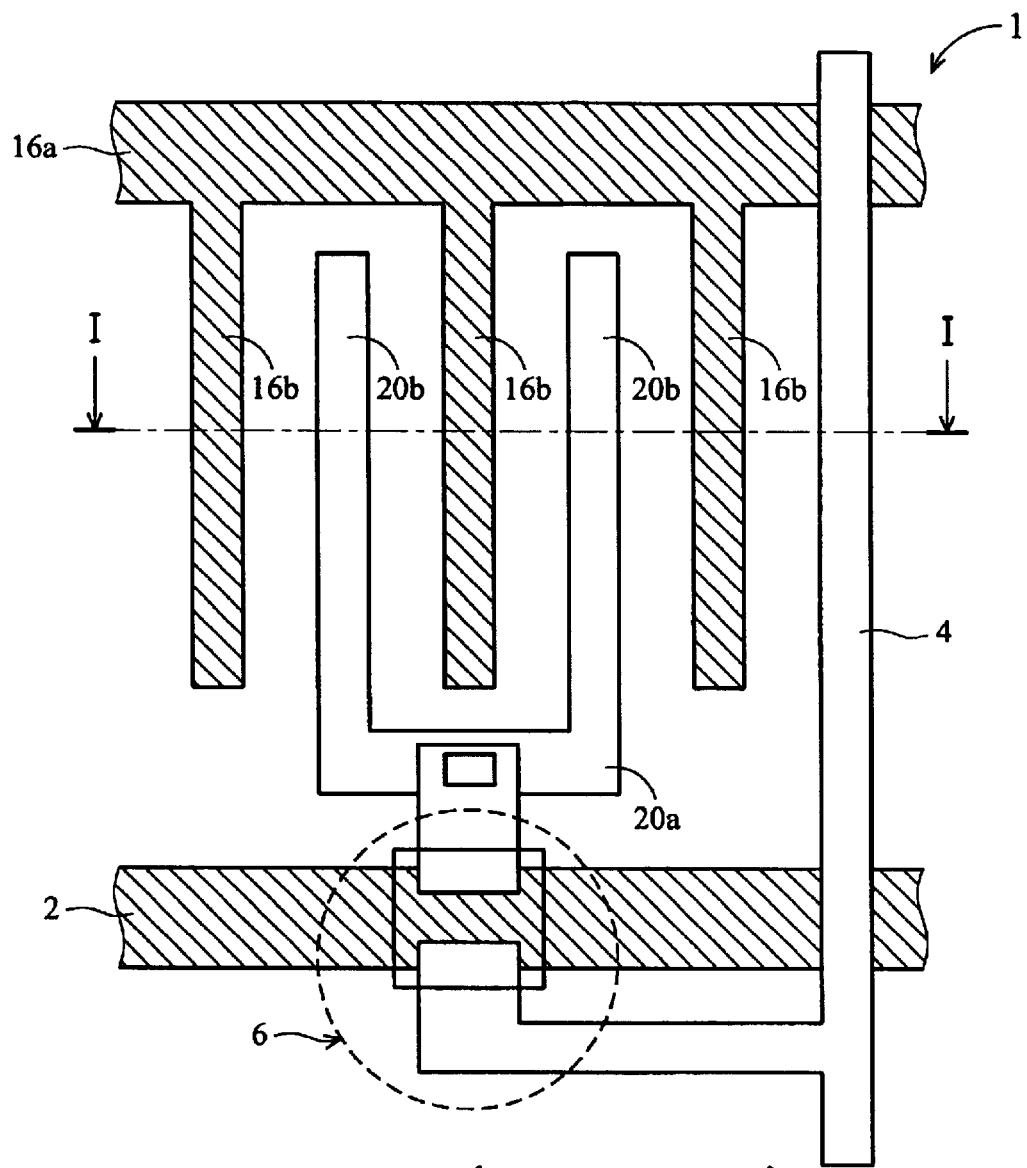
FIG. 5A is a top view showing an electrode array within a pixel area of an IPS-LCD according to the prior art.
Figure 5B:
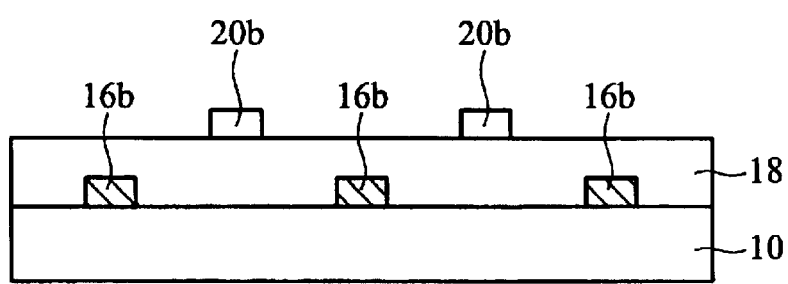
FIG. 5B is a sectional view along line I—I of FIG. 5A showing the electrode array of the IPS-LCD according to the prior art.
Figure 6:
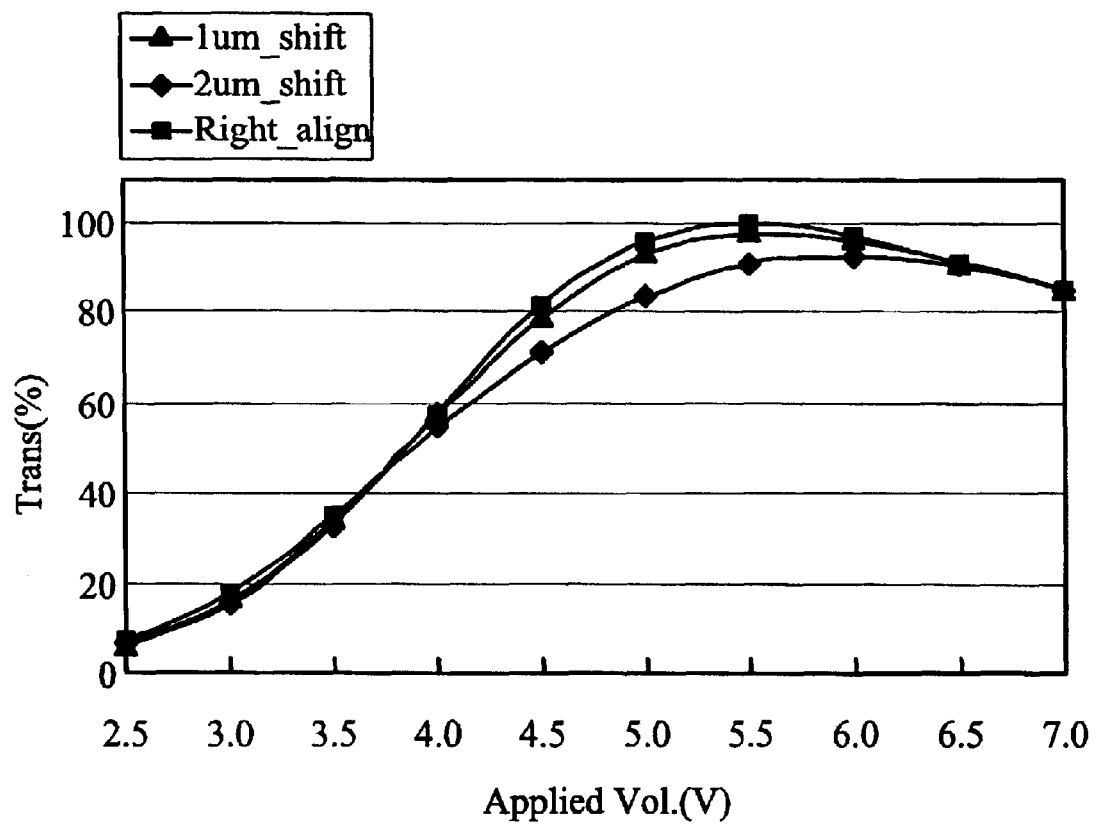
FIG. 6 is a simulation result of the misalignment effect.
Figure 7A:
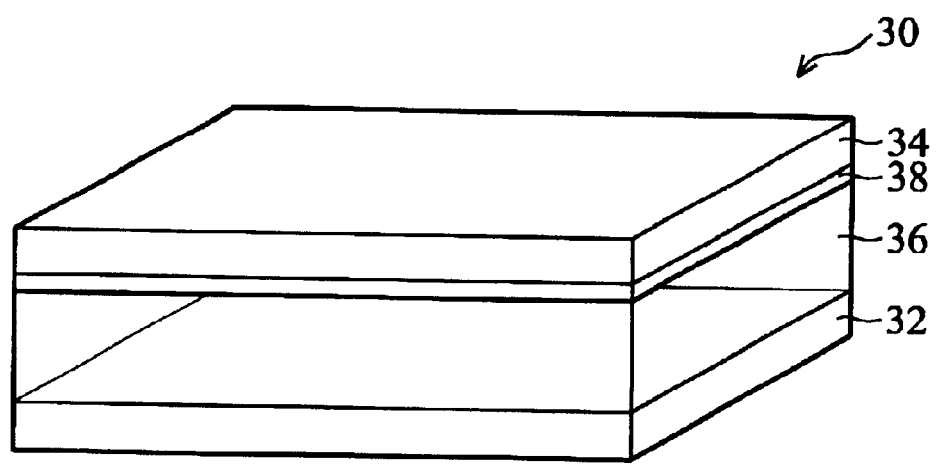
FIG. 7A is a sectional diagram showing an IPS-LCD according to the invention.
Figure 7B:
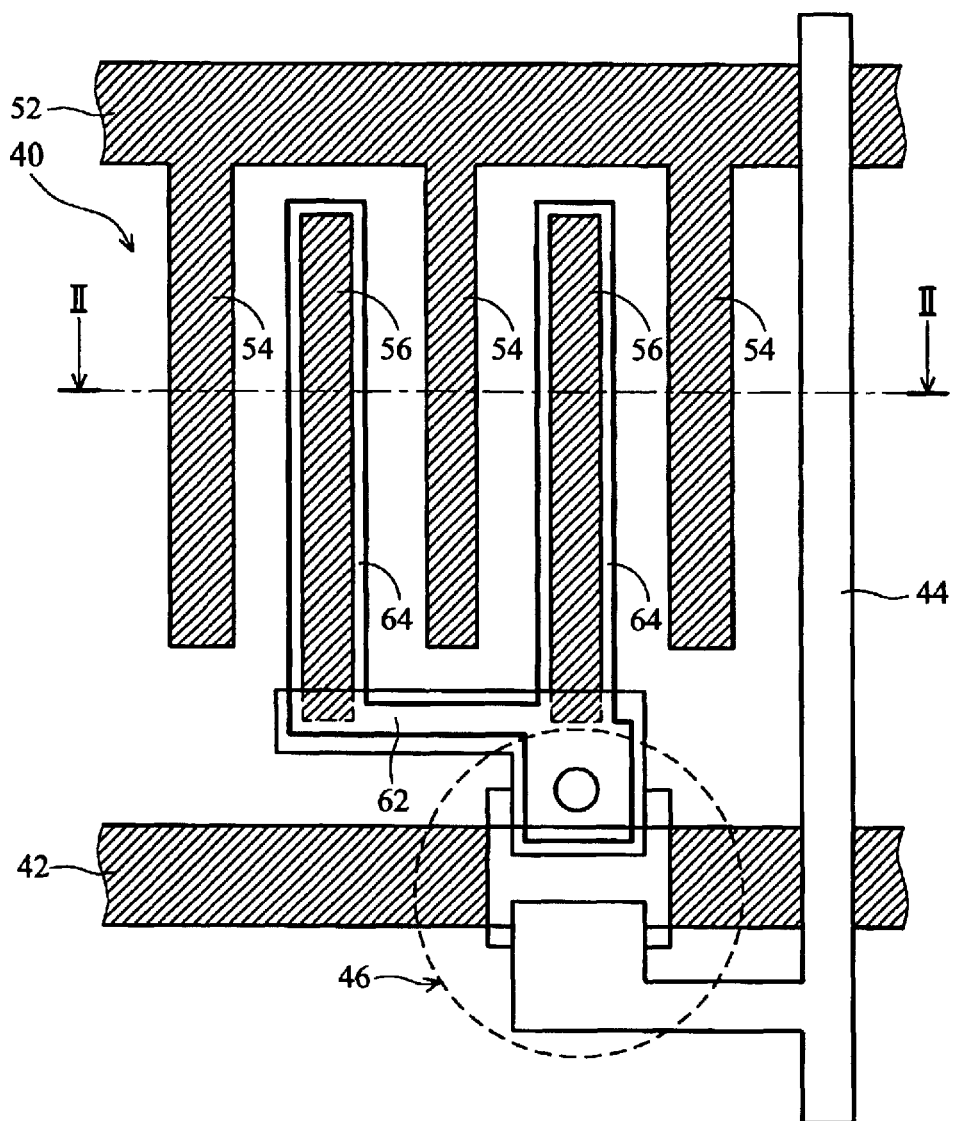
FIG. 7B is a top view showing an electrode array within a pixel area of an IPS-LCD according to the first embodiment of the present invention.
Figure 7C:
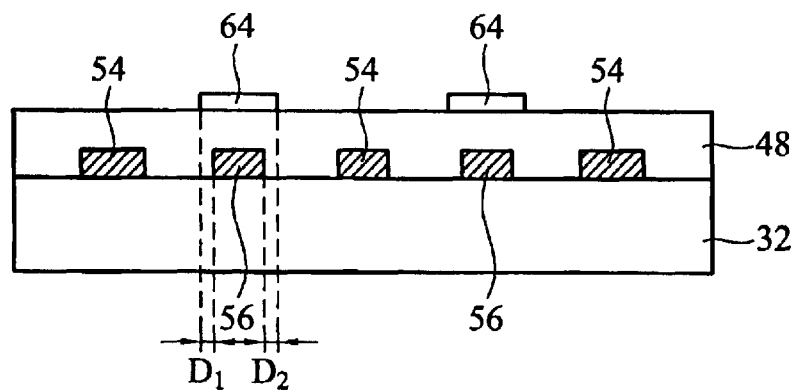
FIG. 7C is a sectional diagram along line II—II shown in FIG. 7B.

FIG. 7A is a sectional diagram showing an IPS-LCD according to the invention. FIG. 7B is a top view showing an electrode array within a pixel area of an IPS-LCD according to the first embodiment of the present invention. FIG. 7C is a sectional diagram along line II—II shown in FIG. 7B.

As shown in FIG. 7A, an IPS-LCD 30 comprises a pair of glass substrates 32 and 34 arranging in parallel and a liquid crystal layer 36 formed in a space between the two glass substrates 32 and 34. The bottom glass substrate 32 serves as a TFT array substrate, on which gate lines, data lines, common electrodes, pixel electrodes are patterned. The upper substrate 34 serves as a color filter substrate, on which a color filter film 38 and a black matrix are patterned. Hereinafter, an electrode array within a pixel area on the bottom glass substrate 32 of the IPS-LCD 30 is described.

As shown in FIGS. 7B and 7C, on the bottom glass substrate 32, a plurality of gate lines 42 extending along X-axis and a plurality of data lines 44 extending along Y-axis forms a plurality of pixel areas 40 arranged in a matrix form. Each of the pixel areas 40 comprises a TFT structure 46, a comb-shaped common electrode structure, a floating metal pattern, and a comb-shaped pixel electrode structure. In this case, the comb-shaped common electrode structure comprises a common bus line 52 disposed in X-axis and a plurality of common electrodes 54 extending away from the common bus line 52 along a first direction of Y-axis. Preferably, in one pixel area 40, there are three common electrodes 54. The comb-shape pixel electrode structure comprises a bar 62 disposed near the TFT structure 46 and at least one pixel electrode 64 extending away from the bar 62 along a second direction of Y-axis. Preferably, in one pixel area 40, there are two pixel electrodes 64. The two pixel electrodes 64 are inter-digitated with the three common electrodes 54. In addition, the floating metal pattern comprises at least one strip-shaped floating metal layer 56 disposed between two adjacent common electrodes 54 and underneath the pixel electrode 64. Preferably, the floating metal pattern has two floating metal layers 56 that extend along Y-axis and are patterned under the two pixel electrodes 64, respectively. Also, the floating metal layer 56 is not connected to the common bus line 54.

As shown in FIG. 7C, the common electrodes 54 and the floating metal layers 56 are patterned on the same plane of the bottom glass substrate 32, an insulating layer 48 is deposited to cover the common electrodes 54 and the floating metal layers 56, and the pixel electrodes 64 are patterned on the insulating layer 64. The common electrodes 54 may be patterned on same plane with the common bus line 52, the data line 44 or the gate line 42. The floating metal layers 56 may be patterned on same plane with the common bus line 52, the data line 44 or the gate line 42. Preferably, the common electrode 54 is a non-transparent material, such as MoW or AlNd, the floating metal layer 56 is a non-transparent material, such as MoW or AlNd, and the pixel electrode 64 is a transparent material, such as ITO or IZO. Also, the width of the pixel electrode 64 is larger than the width of the floating metal layer 56. Preferably, the center of the pixel electrode 64 is aligned to the center of the floating metal layer 56, therefore the distance $D_1$ is equal to $D_2$.

Since the common electrodes 54 and the floating metal layers 56 are patterned on the same plane, the interval between the common electrode 54 and the floating metal layer 56 is easily controlled in the same step of photolithography process. Also, using back exposure from the back side of the bottom glass substrate 32 to fine tune the pattern of pixel electrodes 64, the center of the pixel electrode 64 can be aligned to the center of the floating metal layer 56. Therefore, the interval between the common electrode 56 and the pixel electrode 64 can be fixed at a constant distance to provide the same degree of in-plane electric field in each sub-pixel area. This results in the same capacitance and transmittance in each sub-pixel area to eliminate trip mura, shot mura and flicker found in the conventional IPS-LCD.

Hereinafter, a method of forming the electrode array shown in FIG. 7 is described.

Figure 8A:
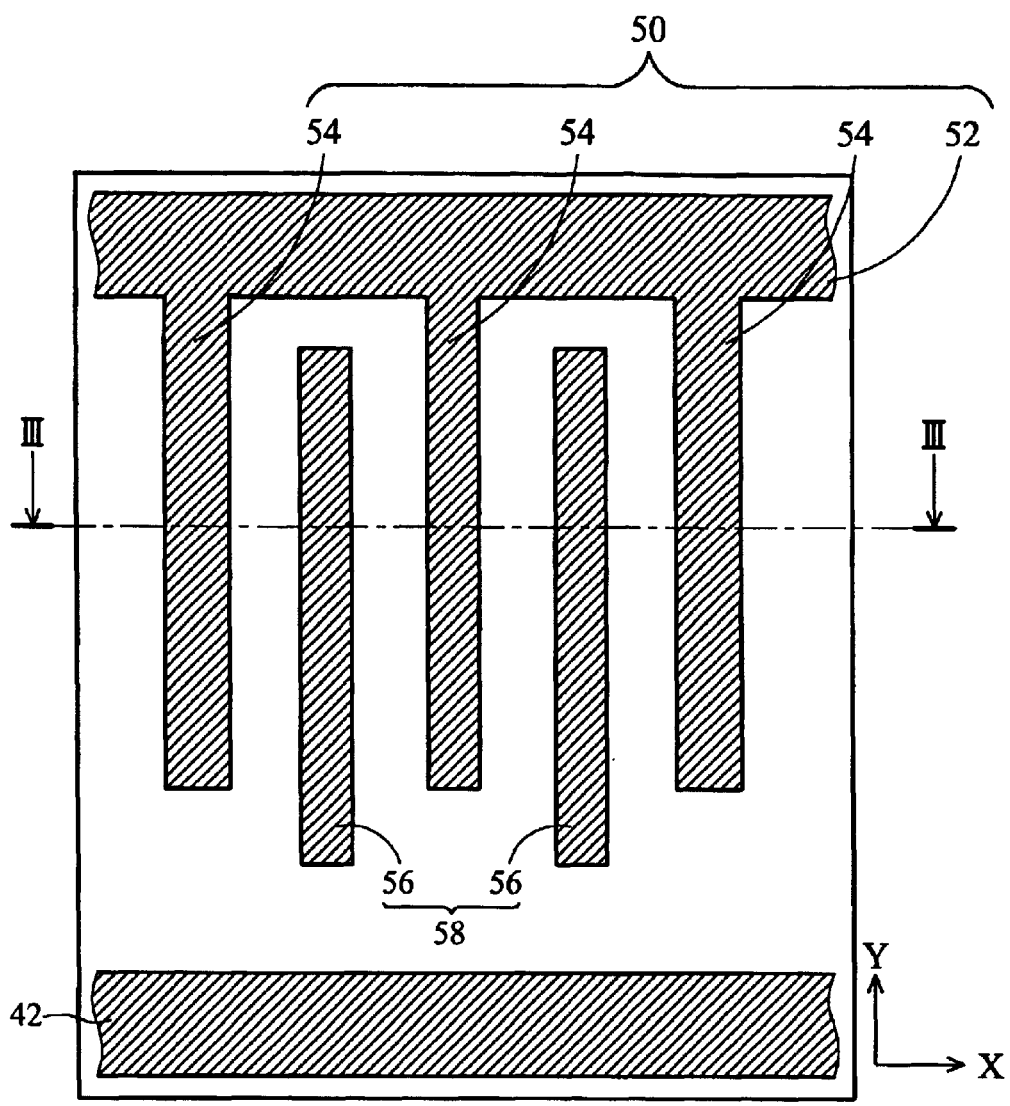
FIG. 8A is a top view showing a first step of forming the electrode array within a pixel area of the first embodiment.
Figure 8B:
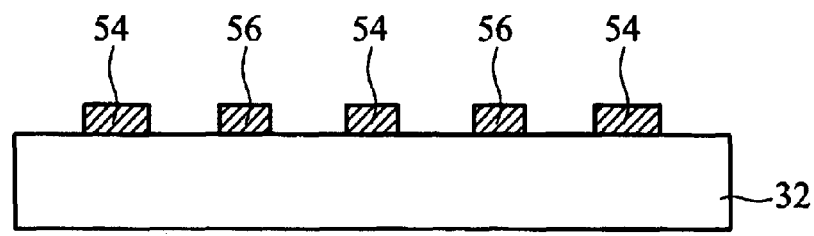
FIG. 8B is a sectional view along line III—III shown in FIG. 8A.

FIG. 8A is a top view showing a first step of forming the electrode array within a pixel area of the first embodiment. FIG. 8B is a sectional view along line III—III shown in FIG. 8A. On the bottom glass substrate 32, a first metal layer of MoW or AlNd is deposited and patterned to become the gate lines 42, the comb-shape common electrode structure 50 and the floating metal pattern 58. The gate line 42 extends along X-axis. The comb-shaped common electrode structure 50 comprises the common bus line 52 disposed in X-axis and three common electrodes 54 extending away from the common bus line 52 along a first direction of Y-axis. The floating metal pattern 58 comprises two floating metal layers 56 disposed in Y-axis and inter-digitated with the three common electrodes 54.

Figure 9A:
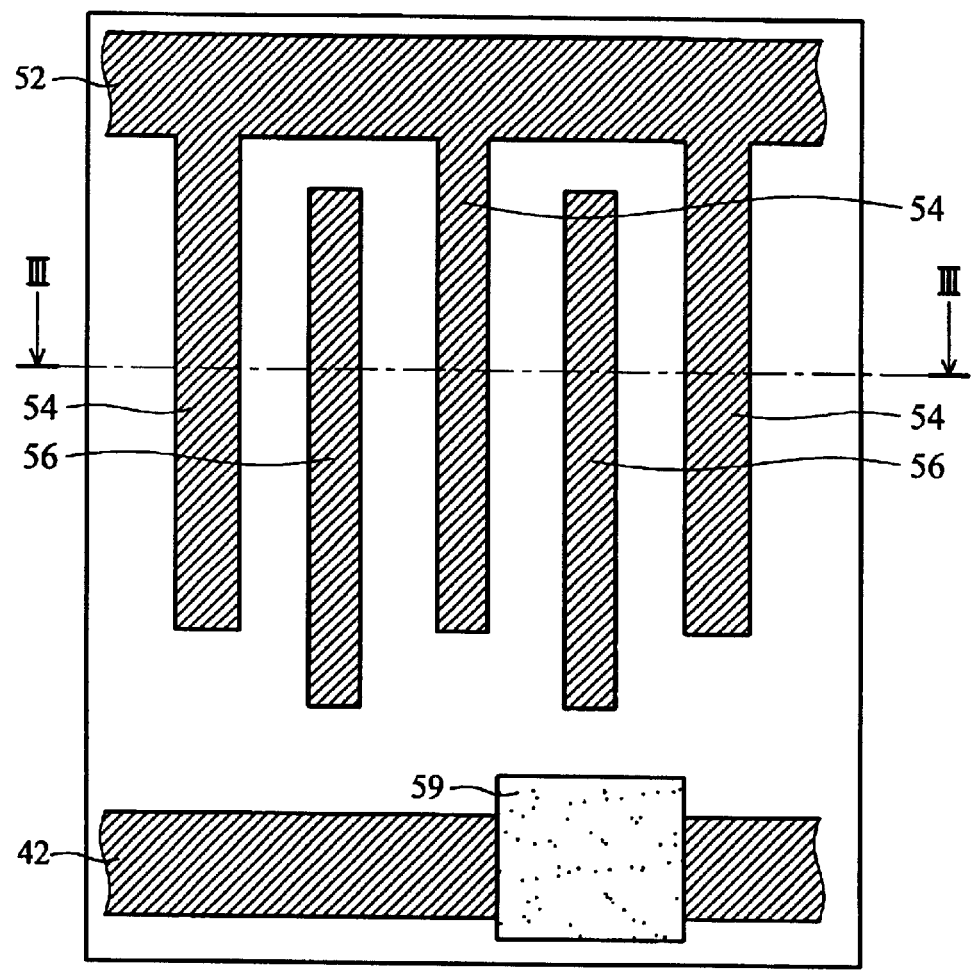
FIG. 9A is a top view showing a second step of forming the electrode array within a pixel area of the first embodiment.
Figure 9B:
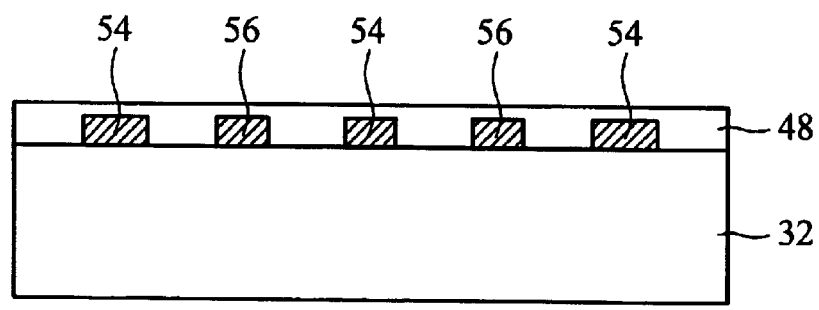
FIG. 9B is a sectional view along line III—III shown in FIG. 9A.

FIG. 9A is a top view showing a second step of forming the electrode array within a pixel area of the first embodiment. FIG. 9B is a sectional view along line III—III shown in FIG. 9A. After completes the gate lines 42, the comb-shape common electrode structure 50 and the floating metal pattern 58, an insulating layer 48, a first semiconductor layer and a second semiconductor layer are sequentially deposited. Preferably, the first semiconductor layer is amorphous silicon (a-Si:H), and the second semiconductor layer is n$^+$-doped amorphous silicon (n$^+$a-Si:H). Then, using photolithography and etching processes, the first semiconductor layer and the second semiconductor layer are patterned to be an island structure 59 on a predetermined area (a gate electrode region) of the gate line 42.

Figure 10A:
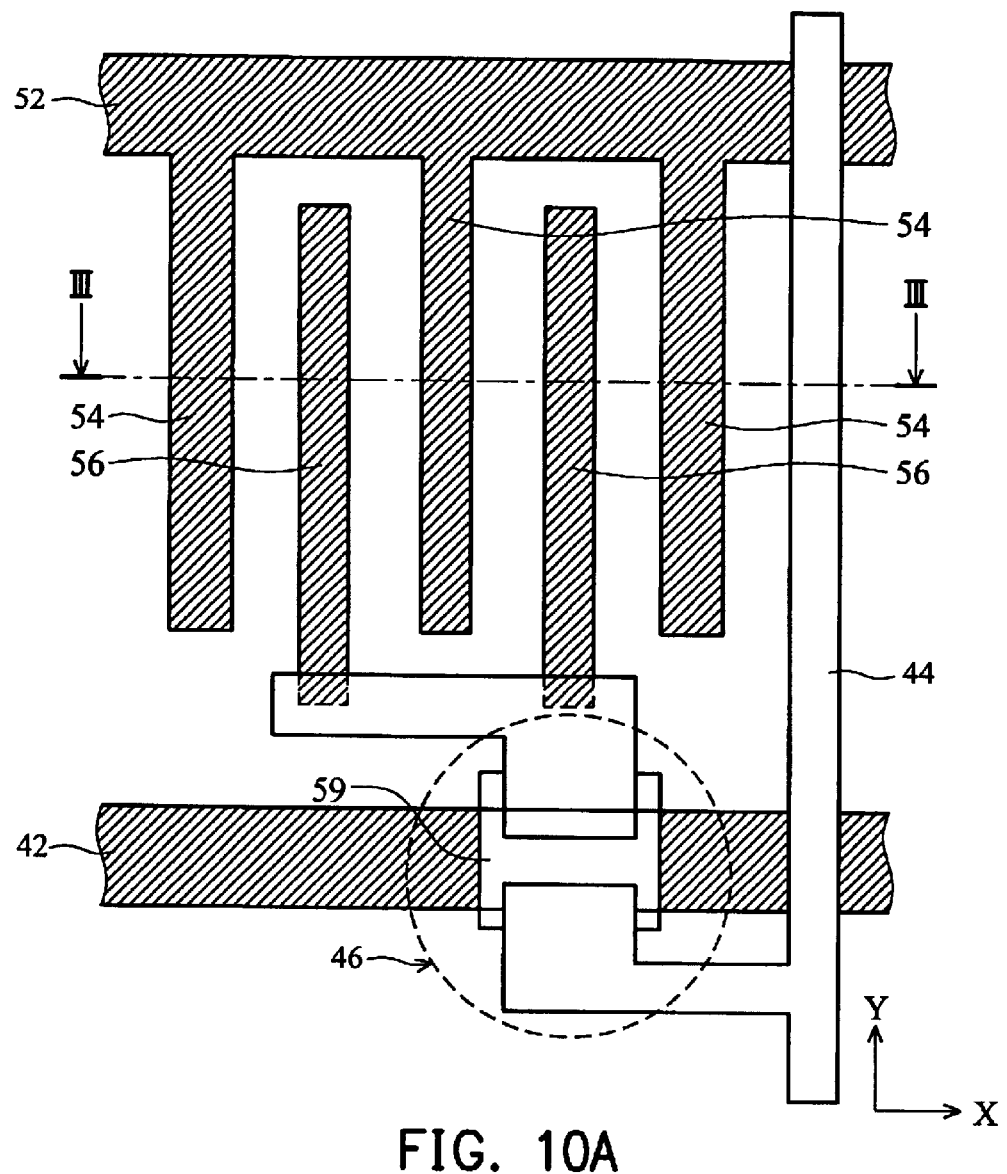
FIG. 10A is a top view showing a third step of forming the electrode array within a pixel area of the first embodiment.
Figure 10B:
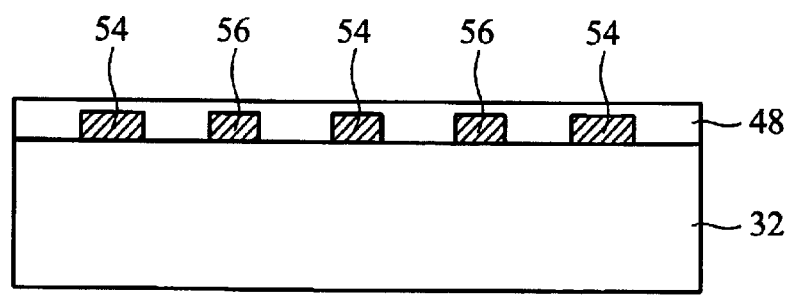
FIG. 10B is a sectional view along line III—III shown in FIG. 10A.

FIG. 10A is a top view showing a third step of forming the electrode array within a pixel area of the first embodiment. FIG. 10B is a sectional view along line III—III shown in FIG. 10A. When a second metal layer is deposited on the bottom glass substrate 32, a part of the second metal layer is patterned to become the data lines 44 extending along Y-axis. Thus, the gate lines 42 and the data lines 44 forms a plurality of pixel areas 40 arranged in a matrix form. Also, another part of the second metal layer are patterned on the island structure 59, and then separated by an opening to serve as a source/drain electrode. Moreover, in the island structure 59, the second semiconductor layer is separated by an opening to serve as a source/drain diffusion region, and the first semiconductor layer serves as a channel region. Therefore, the gate electrode, the source/drain electrode, source/drain diffusion region and the channel region complete the TFT structure 46.

Figure 11A:
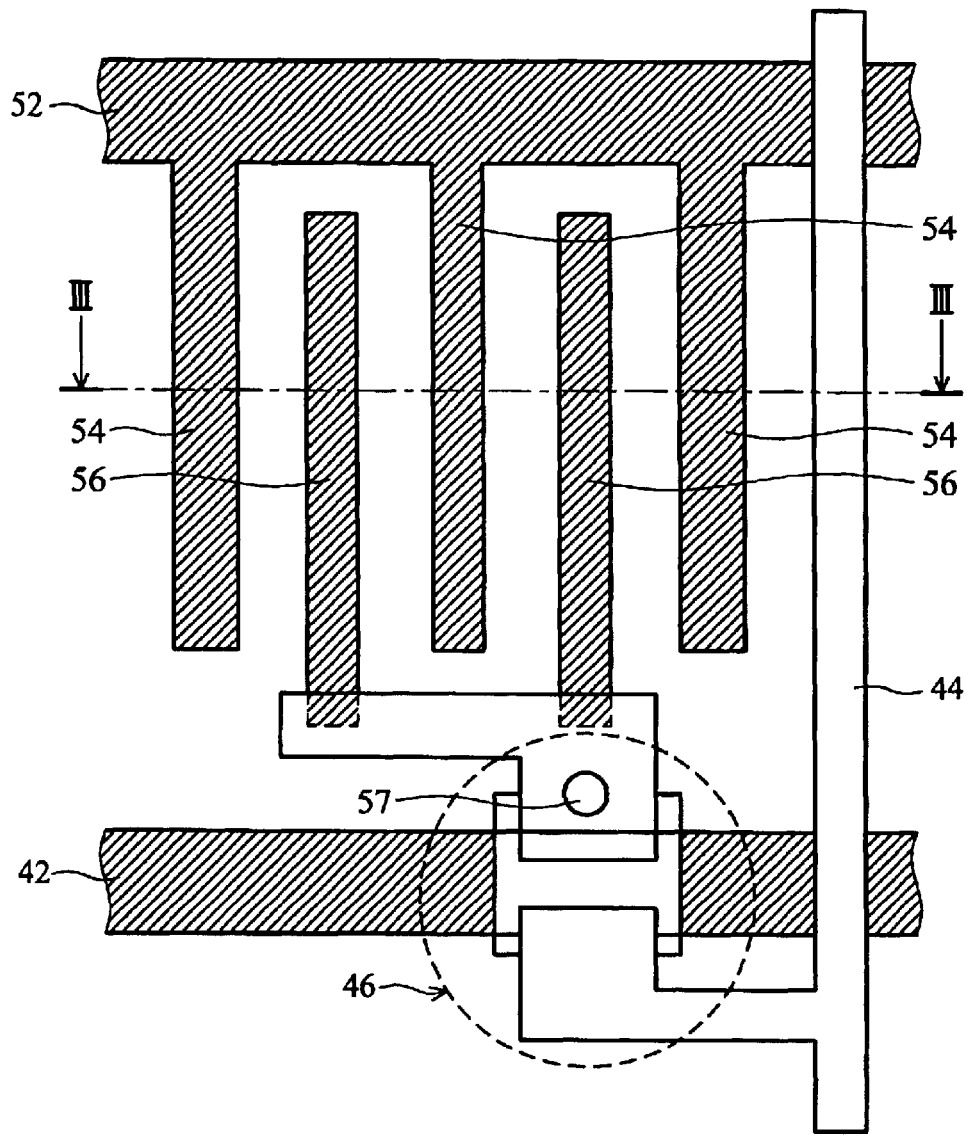
FIG. 11A is a top view showing a fourth step of forming the electrode array within a pixel area of the first embodiment.
Figure 11B:
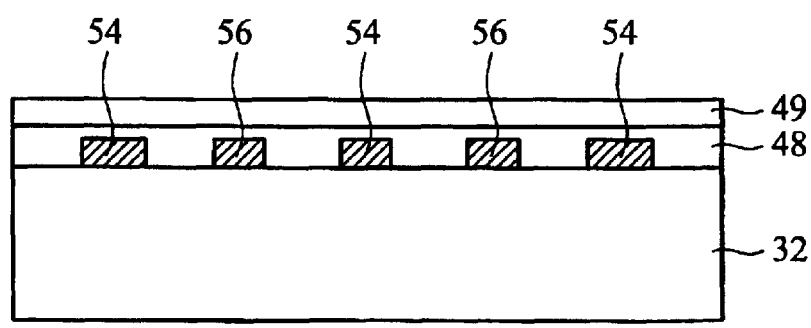
FIG. 11B is a sectional view along line III—III shown in FIG. 11A.

FIG. 11A is a top view showing a fourth step of forming the electrode array within a pixel area of the first embodiment. FIG. 11B is a sectional view along line III—III shown in FIG. 11A. A passivation layer 49 of SiNx is deposited to cover the whole surface of the bottom glass substrate 32. Then, using photolithography and etching processes, a via hole 57 is formed in the passivation layer 49 to expose the drain region.

Figure 12A:
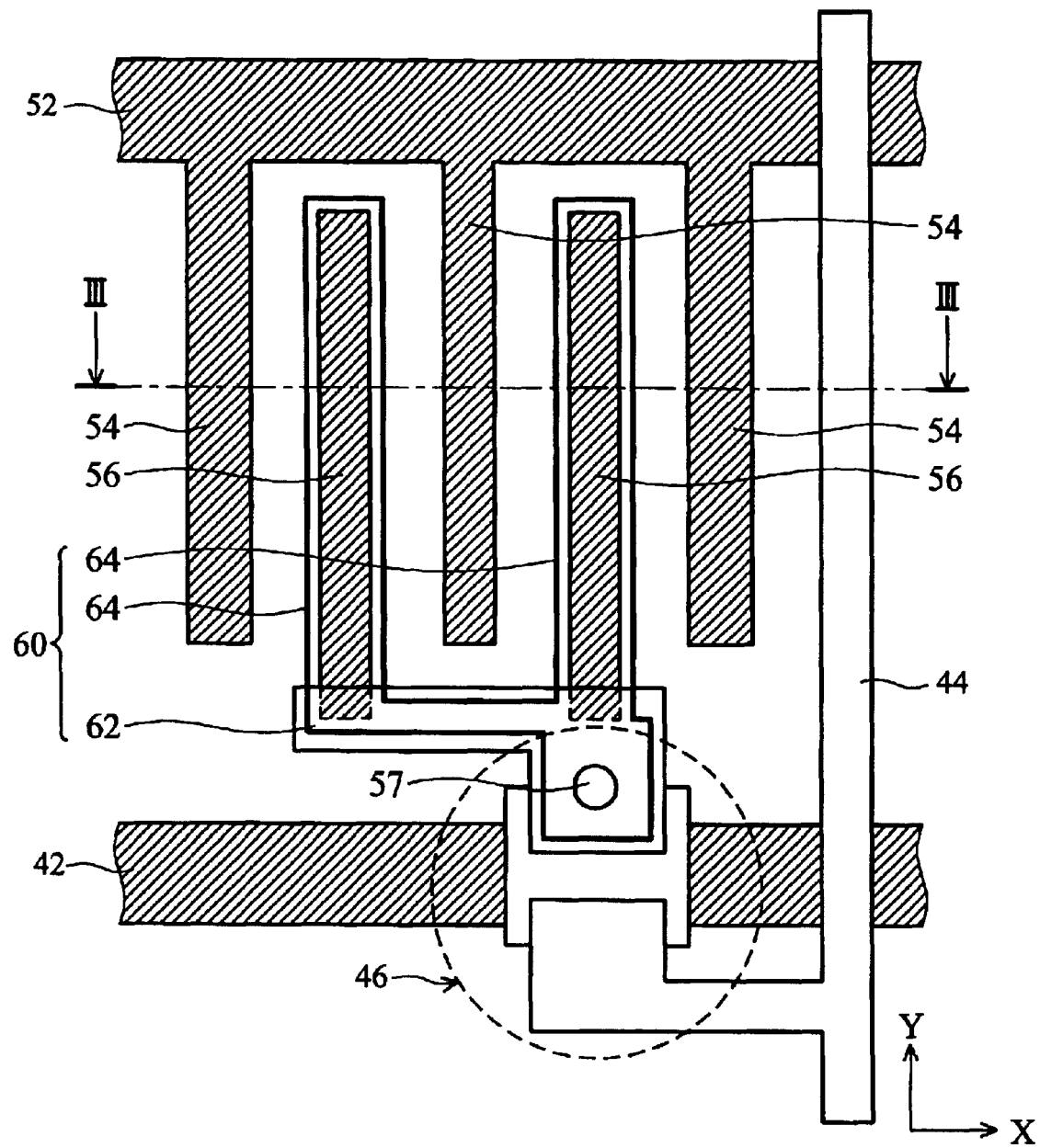
FIG. 12A is a top view showing a fifth step of forming the electrode array within a pixel area of the first embodiment.
Figure 12B:
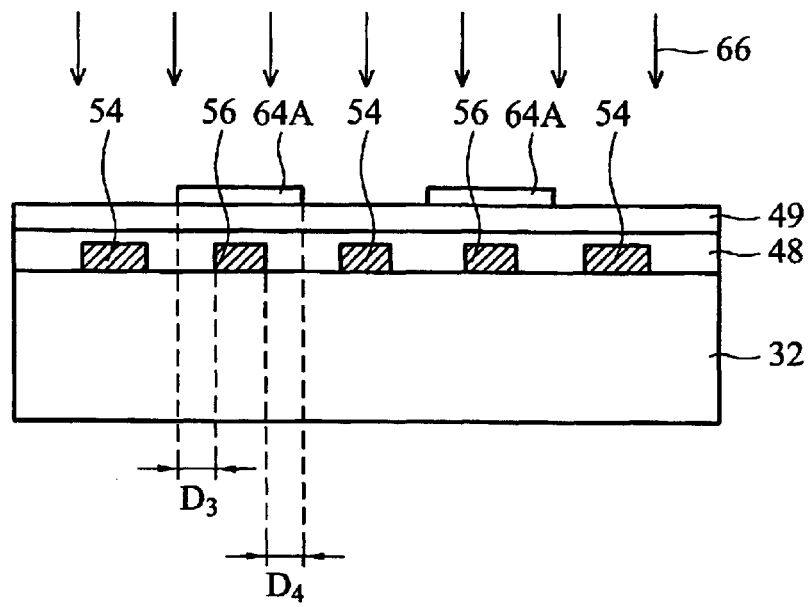
FIG. 12B is a sectional view along line III—III shown in FIG. 12A.
Figure 12C:
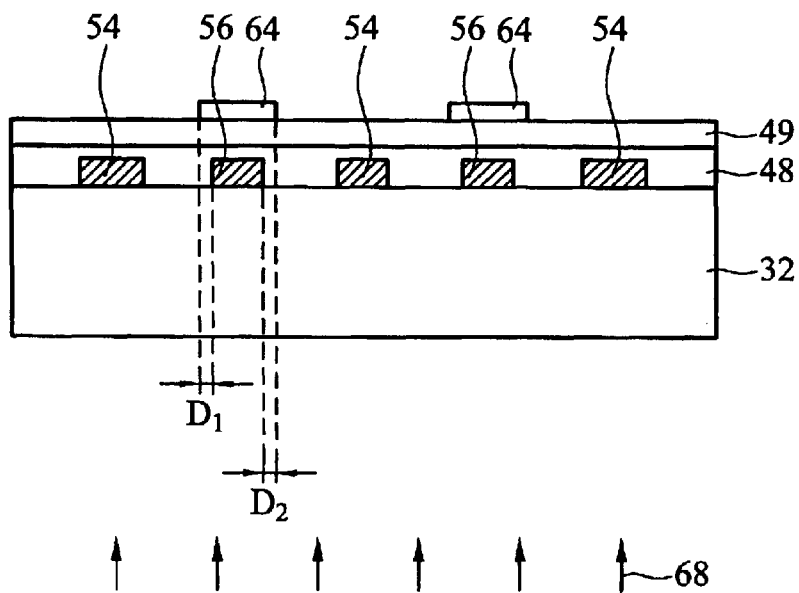
FIG. 12C is a sectional view along line III—III shown in FIG. 12A.

FIG. 12A is a top view showing a fifth step of forming the electrode array within a pixel area of the first embodiment. FIG. 12B is a sectional view along line III—III shown in FIG. 12A. FIG. 12C is a sectional view along line III—III shown in FIG. 12A. A transparent electrode layer, such as ITO or IZO, is deposited on the entire surface of the bottom glass substrate 32 to fill the via hole 57. Then, using photolithography and etching processes, the transparent electrode layer is patterned to become a comb-shaped pixel electrode structure 60, which comprises a bar 62 and two pixel electrodes 64. The two pixel electrodes 64 that extend in a second Y-axis cover the two floating metal layer 56 and are inter-digitated with the three common electrodes 54. For achieving a misalignment free structure, two steps of exposure are required and described as follows.

First, as shown in FIG. 12B, using a top exposure process 66 from the top side of the bottom glass substrate 32 with a mask, the transparent electrode layer is patterned to provide a plurality of predetermined pixel electrodes 64A over the floating metal layers 56, respectively. The top exposure process 66 is employed to ensure that the predetermined pixel electrode 64A covers the floating metal layers 56, and the mask of a larger pattern size is used to roughly tune the relationship between the predetermined pixel electrode 64A and the floating metal layer 56. Therefore, the width of the predetermined pixel electrode 64A is more than 0.25 $\mu$m larger than the ideal size, and the distance $D_3$ or $D_4$ is larger than the ideal distance $D_1$ or $D_2$.

Next, as shown in FIG. 12C, using a back exposure process 68 from the back side of the bottom glass substrate 32 with the floating metal layers 56 as a mask, the predetermined pixel electrodes 64A are patterned to become the pixel electrodes 64 with an ideal size and perfect alignment to the floating metal layers 56. The back exposure process 68 is employed to fine tune the relationship between the pixel electrode 64 and the floating metal layer 56 to ensure the distance $D_1$ is equal to the distance $D_2$.

[Second Embodiment]

Figure 13A:
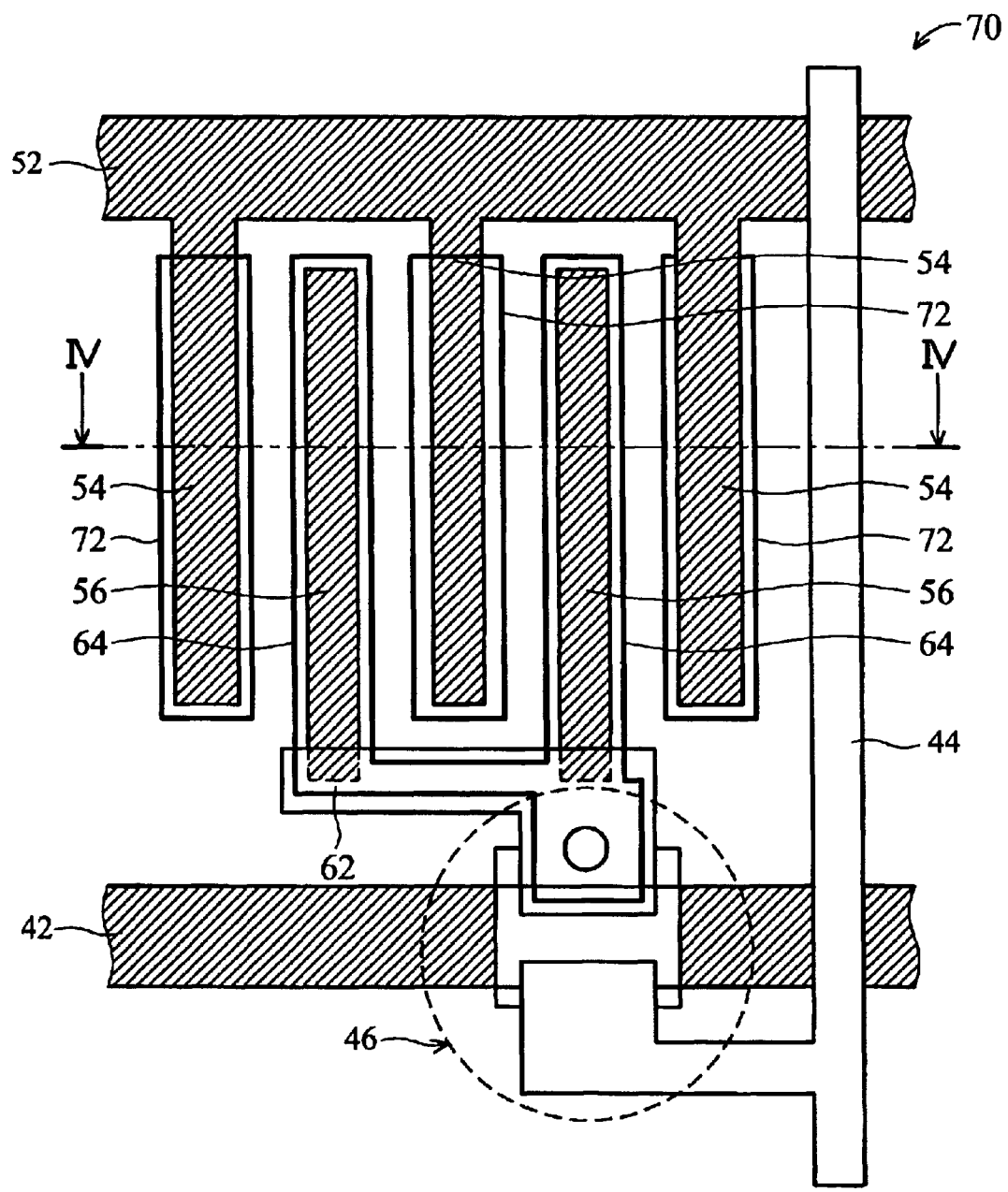
FIG. 13A is a top view showing an electrode array within a pixel area of an IPS-LCD according to the second embodiment of the present invention.
Figure 13B:
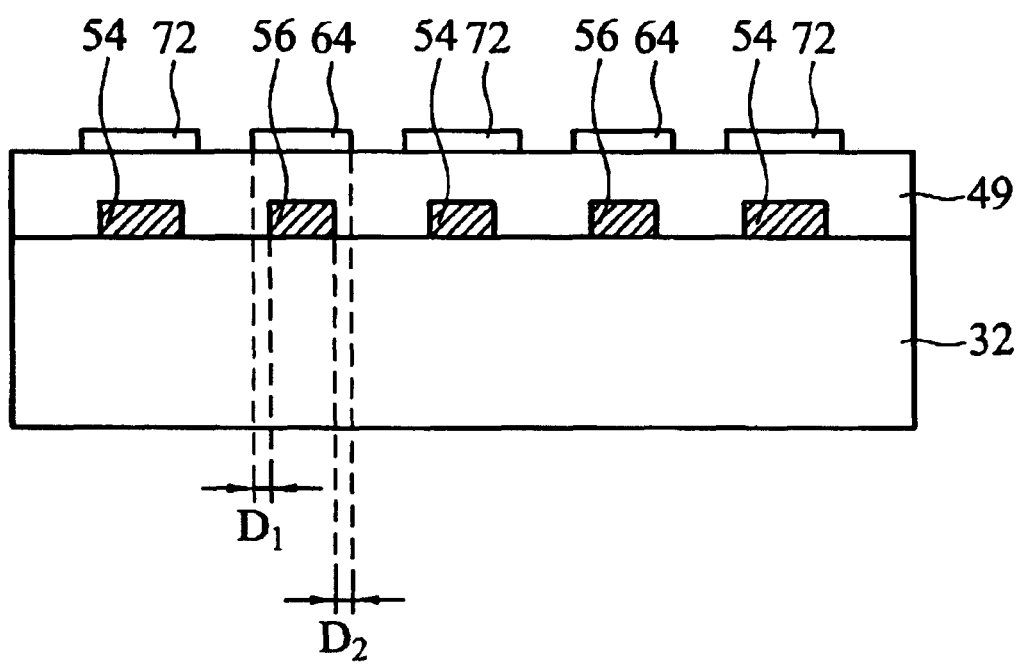
FIG. 13B is a sectional diagram along line IV—IV shown in FIG. 13A.

FIG. 13A is a top view showing an electrode array within a pixel area of an IPS-LCD according to the second embodiment of the present invention. FIG. 13B is a sectional diagram along line IV—IV shown in FIG. 13A.

The second embodiment provides an IPS-LCD 70, in which the electrode array within the pixel area is almost the same as that described in the first embodiment. The only one difference is that the transparent electrode layer is patterned on the floating metal layers 56 to serve as the pixel electrodes 64 and also patterned on the common electrodes 54 to serve as three transparent compensation electrodes 72. It is noticed that the transparent compensation electrodes 72 is floated between two adjacent pixel electrodes 64, without overlapping the common bus line 52, the gate line 42 and the data line 44.

The method of forming the electrode array of the IPS-LCD 70 is almost the same as that described in the first embodiment. The difference is that the top exposure process on the transparent electrode layer extra provides a pattern of the transparent compensation electrodes 72, and then the back exposure process can use the common electrodes 54 and the floating metal layers 56 as the mask to fine tune the width of the transparent compensation electrodes 72 and the width of pixel electrodes 64.

Since the transparent compensation electrodes 72 and the pixel electrodes 64 are patterned on the same plane, the interval between the transparent compensation electrode 72 and the pixel electrode 64 is easily controlled in the same step of photolithography process, resulting in the same capacitance and transmittance. This eliminates trip mura, shot mura and flicker found in the conventional IPS-LCD. In addition, the transparent compensation electrodes 72 further improve the aperture ratio of the IPS-LCD 70.

[Third Embodiment]

Figure 14A:
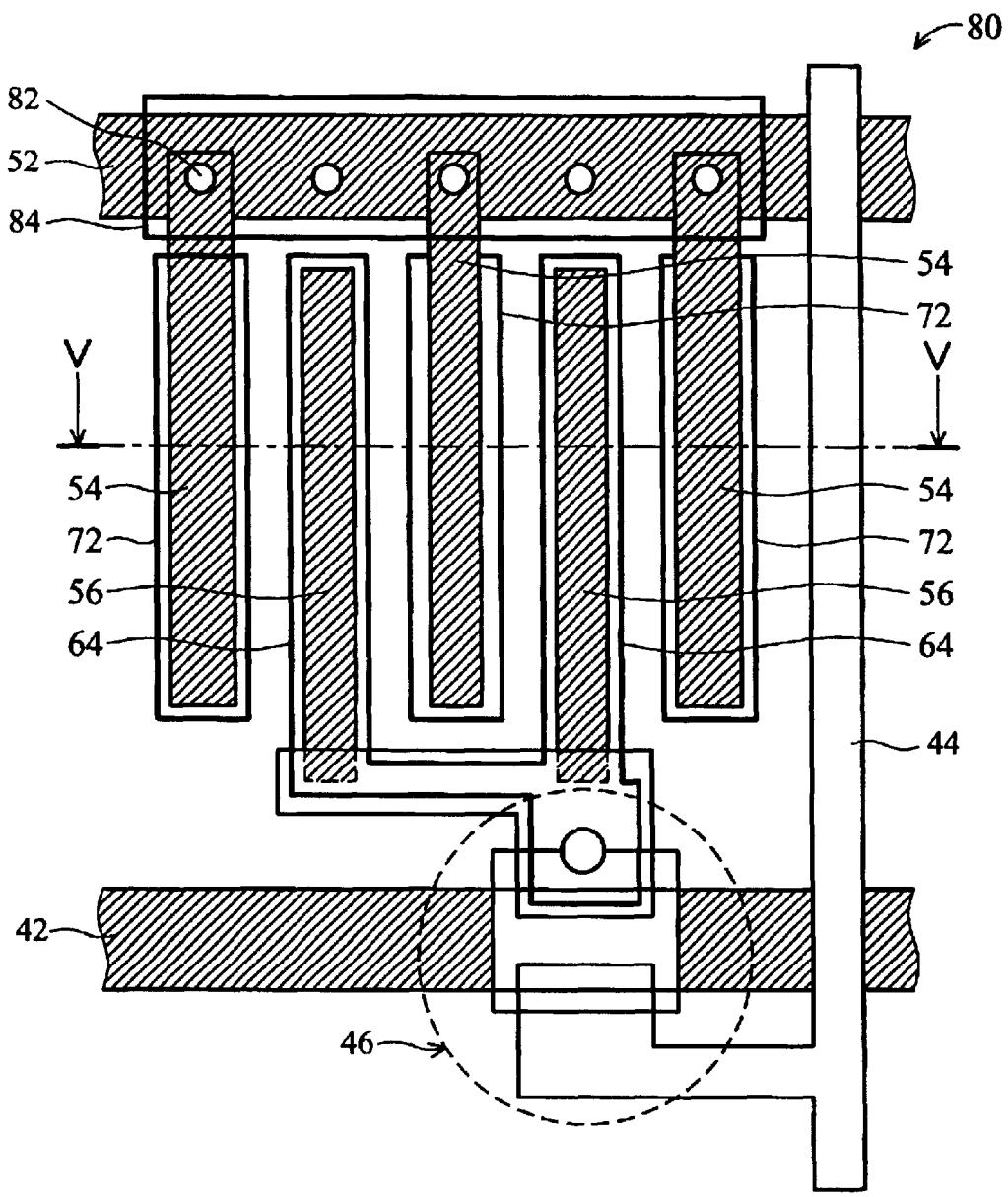
FIG. 14A is a top view showing an electrode array within a pixel area of an IPS-LCD according to the third embodiment of the present invention.
Figure 14B:
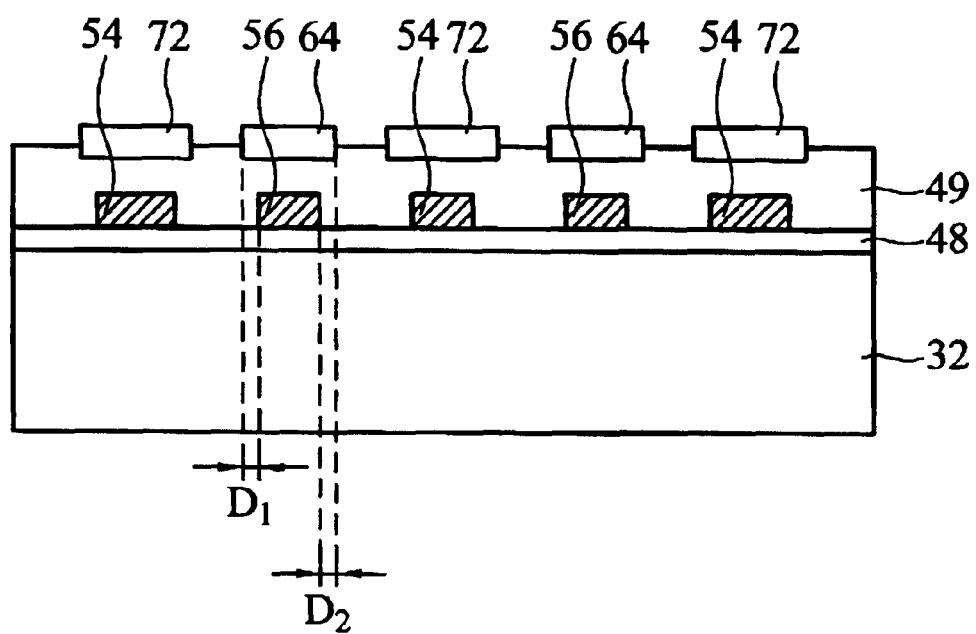
FIG. 14B is a sectional diagram along line V—V shown in FIG. 14A.

FIG. 14A is a top view showing an electrode array within a pixel area of an IPS-LCD according to the third embodiment of the present invention. FIG. 14B is a sectional diagram along line V—V shown in FIG. 14A.

The third embodiment provides an IPS-LCD 80, in which the electrode array within the pixel area is almost the same as that described in the second embodiment. The differences are described as follows. First, the first metal layer is patterned as the gate line 42 and the common bus line 52, and the second metal layer is patterned as the data line 44, the common electrode 54 and the floating metal layer 56. Thus, a via hole 82 is required to provide an electrically connection between the common bus line 52 and the common electrode 54. Second, in addition to the pixel electrodes 64 and transparent compensation electrodes 72, the transparent electrode layer is patterned on the common bus line 52 to serve as an electrode plate 84. It is noticed that the electrode plate 84 is floated without connecting the pixel electrodes 64 and transparent compensation electrodes 72.

The method of forming the electrode array of the IPS-LCD 80 is almost the same as that described in the second embodiment. The difference is that the top exposure process on the transparent electrode layer extra provides a pattern of the electrode plate 84, and then the back exposure process can use the common bus line 52, the common electrodes 54 and the floating metal layers 56 as the mask to fine tune the width of the electrode plate 84, the transparent compensation electrodes 72 and the width of pixel electrodes 64.

Compared with the first embodiment and the second embodiment, the third embodiment provides the electrode plate 84 over the common bus line 52 to contribute a storage capacitor. Also, the combination of the electrode plate 82 and the transparent compensation electrodes 72 further improves the aperture ratio of the IPS-LCD 80.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An in-plane switching liquid crystal display with an alignment free structure, comprising:
    a first substrate and a second substrate arranging in parallel to each other;
    a liquid crystal layer formed in a space between first substrate and the second substrate;
    a plurality of gate lines extending in a first direction and formed on the first substrate;
    a plurality of data lines extending in a second direction and formed on the first substrate, wherein the second direction is perpendicular to the first direction, and the data lines and gate lines constitute a plurality of pixel areas arranging in a matrix form;
    a plurality of TFT structures formed in the plurality of pixel areas respectively;
    a plurality of comb-shaped common electrode structures disposed in the plurality of pixel areas respectively on the first substrate, wherein each comb-shaped common electrode structure comprises a common bus line parallel to the gate line and at least two common electrodes extending in the second direction;
    a plurality of floating metal patterns disposed in the plurality of pixel areas respectively on the first substrate, wherein each floating metal pattern comprises at least one floating metal layer which extends in the second direction between the two common electrodes and is patterned on the same plane with the common electrodes; and
    a plurality of comb-shaped pixel electrode structures disposed in the plurality of pixel areas respectively on the first substrate, wherein each comb-shaped pixel electrode structure comprises a bar near the gate line and at least one pixel electrode which extends in the second direction between the two common electrodes and covers the floating metal layer;

wherein, the center of the pixel electrode is aligned to the center of the floating metal layer, each interval between two adjacent common electrode and pixel electrode is fixed at a constant, and the width of the pixel electrode is larger than the width of the floating metal layer.

2. The in-plane switching liquid crystal display with an alignment free structure as claimed in claim 1, wherein the width of the pixel electrode is more than 0.25 µm larger than the width of the floating metal layer.

3. The in-plane switching liquid crystal display with an alignment free structure as claimed in claim 1, further comprising an insulating layer disposed between the pixel electrode and the floating metal layer.

4. The in-plane switching liquid crystal display with an alignment free structure as claimed in claim 1, wherein the pixel electrode is made of a transparent conductive material.

5. The in-plane switching liquid crystal display with an alignment free structure as claimed in claim 1, wherein the common electrode and the floating metal layer are made of a non-transparent conductive material.

6. The in-plane switching liquid crystal display with an alignment free structure as claimed in claim 1, wherein the common electrode and the floating metal layer are patterned on the same plane with the common bus line and the gate line.

7. A method of forming an in-plane switching liquid crystal display with an alignment free structure, comprising steps of:

providing a substrate;

forming a plurality of gate lines extending in a first direction on the substrate;

forming a comb-shaped common electrode structure within each predetermined pixel area, wherein the comb-shaped common electrode structure comprises a common bus line parallel to the gate line and at least two common electrodes extending in a second direction that is perpendicular to the first direction;

forming a floating metal pattern within each predetermined pixel area, wherein the floating metal pattern comprises at least one floating metal layer extending in the second direction between the two common electrodes;

forming an insulating layer to cover the gate lines, the comb-shaped common electrode structure, the floating metal pattern and substrate;

forming a plurality of data lines extending in the second direction on the insulating layer, wherein the data lines and the gate lines constitute a plurality of pixel areas arranging in a matrix form;

forming a passivation layer on the entire surface of the substrate; forming a comb-shaped pixel electrode structure disposed in each pixel area on the passivation layer, wherein the comb-shaped pixel electrode structure comprises a bar near the gate line and at least one pixel electrode that extends in the second direction between the two common electrodes and covers the floating metal layer;

wherein the center of the pixel electrode is aligned to the center of the floating metal layer, and each interval between two adjacent common electrode and pixel electrode is fixed at a constant.

8. The method of forming an in-plane switching liquid crystal display with an alignment free structure as claimed in claim 7, further comprising steps of forming a TFT structure within each pixel area:

before the formation of the data line, forming an island structure on a predetermined area of the gate line, wherein the island structure is stacked by a first semiconductor layer and a second semiconductor layer;

at the same time when forming the data line, forming a source/drain electrode layer on the island structure; and patterning the island structure to form the first semiconductor layer as a source/drain diffusion layer.

9. The method of forming an in-plane switching liquid crystal display with an alignment free structure as claimed in claim 8, further comprising steps of:

forming a via hole in the passivation layer to expose the drain electrode layer; and forming the bar of the comb-shaped pixel electrode structure to electrically connecting the drain electrode layer through the via hole.

10. The method of forming an in-plane switching liquid crystal display with an alignment free structure as claimed in claim 7, wherein the width of the pixel electrode is larger than the width of the floating metal layer.

11. The method of forming an in-plane switching liquid crystal display with an alignment free structure as claimed in claim 10, wherein the width of the pixel electrode is more than 0.25 µm larger than the width of the floating metal layer.

12. The method of forming an in-plane switching liquid crystal display with an alignment free structure as claimed in claim 7, wherein the pixel electrode is made of a transparent conductive material.

13. The method of forming an in-plane switching liquid crystal display with an alignment free structure as claimed in claim 7, wherein the common electrode and the floating metal layer are made of a non-transparent conductive material.

14. The method of forming an in-plane switching liquid crystal display with an alignment free structure as claimed in claim 7, wherein the common electrode and the floating metal layer are patterned on the same plane with the common bus line and the gate line.

15. An in-plane switching liquid crystal display with an alignment free structure, comprising:

a first substrate and a second substrate arranging in parallel to each other;

a liquid crystal layer formed in a space between first substrate and the second substrate;

a plurality of gate lines extending in a first direction and formed on the first substrate;

a plurality of data lines extending in a second direction and formed on the first substrate, wherein the second direction is perpendicular to the first direction, and the data lines and gate lines constitute a plurality of pixel areas arranging in a matrix form; a plurality of TFT structures formed in the plurality of pixel areas respectively;

a plurality of comb-shaped common electrode structures disposed in the plurality of pixel areas respectively on the first substrate, wherein each comb-shaped common electrode structure comprises a common bus line parallel to the gate line and at least two common electrodes extending in the second direction;

a plurality of floating metal patterns disposed in the plurality of pixel areas respectively on the first substrate, wherein each floating metal pattern comprises at least one floating metal layer which extends in the second direction between the two common electrodes and is patterned on the same plane with the common electrodes;

a plurality of comb-shaped pixel electrode structures disposed in the plurality of pixel areas respectively on the first substrate, wherein each comb-shaped pixel electrode structure comprises a bar near the gate line and at least one pixel electrode which extends in the second direction between the two common electrodes and covers the floating metal layer; and a plurality of transparent compensation electrodes disposed in the plurality of pixel areas respectively on the first substrate, wherein each pixel area comprises at least two transparent compensation electrodes which extends in the second direction and covers the two common electrodes;

wherein, the center of the pixel electrode is aligned to the center of the floating metal layer, the center of the transparent compensation electrode is aligned to the center of the common electrode, each interval between the transparent compensation electrode and the pixel electrode is fixed at a constant, and the width of the pixel electrode is larger than the width of the floating metal layer.

16. The in-plane switching liquid crystal display with an alignment free structure as claimed in claim 15, wherein the width of the pixel electrode is more than 0.25 µm larger than the width of the floating metal layer.

17. The in-plane switching liquid crystal display with an alignment free structure as claimed in claim 15, further comprising an insulating layer disposed between the pixel electrode and the floating metal layer.

18. The in-plane switching liquid crystal display with an alignment free structure as claimed in claim 15, wherein the pixel electrode and the transparent compensation electrode are made of a transparent conductive material.

19. The in-plane switching liquid crystal display with an alignment free structure as claimed in claim 15, wherein the common electrode and the floating metal layer are made of a non-transparent conductive material.

20. The in-plane switching liquid crystal display with an alignment free structure as claimed in claim 15, wherein the common electrode and the floating metal layer are patterned on the same plane with the common bus line and the gate line.

21. The in-plane switching liquid crystal display with an alignment free structure as claimed in claim 15, wherein the transparent compensation electrode and the pixel electrode are patterned on the same plane.

22. An in-plane switching liquid crystal display with an alignment free structure, comprising:

a first substrate and a second substrate arranging in parallel to each other;

a liquid crystal layer formed in a space between first substrate and the second substrate;

a plurality of gate lines extending in a first direction and formed on the first substrate;

a plurality of data lines extending in a second direction and formed on the first substrate, wherein the second direction is perpendicular to the first direction, and the data lines and gate lines constitute a plurality of pixel areas arranging in a matrix form;

a plurality of TFT structures formed in the plurality of pixel areas respectively;

a plurality of comb-shaped common electrode structures disposed in the plurality of pixel areas respectively on the first substrate, wherein each comb-shaped common electrode structure comprises a common bus line parallel to the gate line and at least two common electrodes extending in the second direction;

a plurality of floating metal patterns disposed in the plurality of pixel areas respectively on the first substrate, wherein each floating metal pattern comprises at least one floating metal layer which extends in the second direction between the two common electrodes and is patterned on the same plane with the common electrodes;

a plurality of comb-shaped pixel electrode structures disposed in the plurality of pixel areas respectively on the first substrate, wherein each comb-shaped pixel electrode structure comprises a bar near the gate line and at least one pixel electrode which extends in the second direction between the two common electrodes and covers the floating metal layer;

a plurality of transparent compensation electrodes disposed in the plurality of pixel areas respectively on the first substrate, wherein each pixel area comprises at least two transparent compensation electrodes which extends in the second direction and covers the two common electrodes; and a plurality of electrode plates disposed in the plurality of pixel areas respectively on the first substrate, wherein each pixel area comprises at one electrode plate which extends in the first direction and covers the common bus line without connecting the transparent compensation electrode and the pixel electrode;

wherein, the center of the pixel electrode is aligned to the center of the floating metal layer, the center of the transparent compensation electrode is aligned to the center of the common electrode, each interval between the transparent compensation electrode and the pixel electrode is fixed at a constant, and the width of the pixel electrode is larger than the width of the floating metal layer.

* * * * *